(12) United States Patent
Smyth

(10) Patent No.: US 7,350,641 B2
(45) Date of Patent: Apr. 1, 2008

(54) BLANK FOR MANUFACTURE OF A CASE, A METHOD OF FORMING A CASE, AND THE CASE

(76) Inventor: Iain Smyth, 11 Southfield Road, Cotham Bristol BS6 6AX (GB)

( * ) Notice: Subject to any disclaimer, the term of this patent is extended or adjusted under 35 U.S.C. 154(b) by 173 days.

(21) Appl. No.: 10/523,757

(22) PCT Filed: Aug. 1, 2003

(86) PCT No.: PCT/GB03/03349

§ 371 (c)(1),
(2), (4) Date: Feb. 8, 2005

(87) PCT Pub. No.: WO2004/015710

PCT Pub. Date: Feb. 19, 2004

(65) Prior Publication Data

US 2005/0252800 A1 Nov. 17, 2005

(30) Foreign Application Priority Data

Aug. 8, 2002 (GB) ................................ 0218427.3

(51) Int. Cl.
*B65D 85/57* (2006.01)
(52) U.S. Cl. ..................... 206/308.1; 206/312
(58) Field of Classification Search ............ 206/308.1, 206/309, 311–313, 268, 273, 738–739, 751–755; 229/160.1, 120.18, 120.24
See application file for complete search history.

(56) References Cited

U.S. PATENT DOCUMENTS

| 2,706,037 | A | * | 4/1955 | Feigelman | ............. | 229/120.18 |
|---|---|---|---|---|---|---|
| 2,716,485 | A | * | 8/1955 | Hecker | ............. | 206/45.25 |
| 4,444,314 | A | | 4/1984 | Jacobsson | | |
| 5,096,055 | A | | 3/1992 | Opper | | |
| 5,421,452 | A | | 6/1995 | Hybiske | | |
| 5,460,265 | A | * | 10/1995 | Kiolbasa | ............. | 206/308.1 |
| 5,647,482 | A | * | 7/1997 | Kleinfelder | ............. | 206/308.1 |
| 5,775,490 | A | * | 7/1998 | Baker et al. | ............. | 206/308.1 |
| 6,505,737 | B1 | * | 1/2003 | Sherman | ............. | 206/308.1 |
| 6,557,700 | B1 | * | 5/2003 | Wharton | ............. | 206/308.1 |
| 6,758,333 | B2 | * | 7/2004 | Sherman | ............. | 206/308.1 |
| 6,799,678 | B2 | * | 10/2004 | Sherman | ............. | 206/308.1 |

FOREIGN PATENT DOCUMENTS

| DE | 296 07 718 U1 | 7/1996 |
|---|---|---|
| EP | 0 126 980 A1 | 12/1984 |
| GB | 876761 | 9/1961 |
| GB | 2362376 A | 11/2001 |
| WO | WO 93/24931 | 12/1993 |
| WO | WO 96/37892 | 11/1996 |
| WO | WO 98/54719 | 12/1998 |
| WO | WO 03/039886 A1 | 5/2003 |

* cited by examiner

*Primary Examiner*—Bryon P Gehman
(74) *Attorney, Agent, or Firm*—Reising, Ethington, Barnes, Kisselle, P.C.

(57) ABSTRACT

A blank (1) is provided for forming a case, for example for CDs. The blank is folded such that the CD case has a carriage (14) hingedly attached to the case and offset from a case hinge, such that the carriage slides out of a pocket as the case is opened. The blank (1) is suited to automated manufacture and folding.

14 Claims, 11 Drawing Sheets

BLANK FOR MANUFACTURE OF A CASE, A METHOD OF FORMING A CASE, AND THE CASE

The present invention relates to a case for storing and protecting relatively thin objects, such as data carriers of which compact disks, digital versatile disks (DVD) and minidisks represent examples. The case can also be used to store items such as cigarettes. The invention also relates to the manufacture of such a case.

CD carriers, such as the CD jewel case, are usually made of a hard brittle plastic and have several problems associated with them. The cases are not very robust and tend to break or get damaged very easily during use, or get scratched, especially on the front cover surface which is usually made of a clear plastic. Also, the front cover or lid of the jewel case is not very securely attached to the base of the case and tends to detach quite easily. Further, the hinge mechanism holding the lid and the base together is quite fragile and often breaks.

A further problem with prior art CD cases is that the CD is often held on a circular array of deformable teeth which engage the periphery of a hole formed in the centre of the CD. If the teeth break, then the CD may become free to move within the case and thereby scratch the data carrying surface of the CD.

Most CDs come with a booklet providing information, for example, about the songs and the artist. In the presently used CD jewel cases, the booklet is secured on the inner face of the lid by plastic tabs fixed to the under surface of the lid. This makes it very difficult to pull out the booklet from underneath the tabs. Once the booklet is pulled out it is then very difficult to slot the booklet back into position against the lid.

DVD carriers and minidisk carriers which are based on the CD jewel case system also suffer from the problems described above.

According to a first aspect of the present invention there is provided a case for an object, comprising a first portion hingeably attached to a second portion, and a carriage for holding the object, the carriage being movable in response to relative movement of the first portion with respect to the second portion between a first position where the object is held in a protected space and a second position where the object is presented for removal from the case.

Preferably the first portion forms the front of a case and the second portion forms the rear of a case. However the first and second portions could equally form the top and bottom of the case.

Preferably the first portion is directly hingeably attached to the second portion. This produces a case of a simple and inexpensive design. However, the desire to include promotional material or to create a region where data can be seen, even when the case is stacked with other cases, may result in the first and second portions being separated from one another by an intermediate wall which effectively functions like a spine of a book.

Preferably the carriage is attached to the first portion by a flexible link or by a hinge. The connection between the carriage and the first portion is offset from the hinge connection between the first and second portions. In a preferred embodiment a hinge connection is formed between the carriage and the first portion, and the hinge connection is parallel with the or each hinge interconnecting the first and second portions.

Preferably the protected space is defined, at least in part, by a wall in spaced apart configuration from the second portion, thereby defining a volume or a pocket into which the carriage extends. This has an added advantage that it also holds the carriage adjacent the back portion.

Advantageously at least one of the first or front portion, the second or back portion and carriage is flexible and resilient. Limited flexure of these items is advantageous as it enables the thickness of the case to be minimised or at least kept comparable with existing jewel cases.

The first and/or second portions may be formed with a predetermined depth. This can be partially to give the case a feel of rigidity and volume and also to enhance market acceptance. The first and second portions may have integrally formed or separately added box elements and/or peripheral walls applied so as to define the depth of the case.

Advantageously the case can hold a plurality of disks or other objects simultaneously. This could be achieved by making the case bigger such that two or more disks can be held on a single carriage.

Preferably at least one intermediate element is provided between the first and second portions and is hingeably attached by a further hinge to at least one of the first and second portions. The further hinge is advantageously at or proximate the position of the hinge joining the first and second portions. The intermediate element acts as a rear portion for a first case region formed by it and the first portion, and a front portion for a second case region formed by it and the second portion. Thus one side of the intermediate element defines a protected region for the first case region and has the second carriage hingely attached to a second side thereof at a position offset from its attachment to the front and/or rear portion.

It is thus possible to provide a case for two objects where both objects, such as data carriers, are presented to the user in the same orientation and either can be extracted without the repeated opening out of flaps, as is found in currently used jewel cases. The provision of further intermediate portions enables more CDs, DVDs or the like to be contained within the case.

According to a second aspect of the present invention, there is provided a carrier for a plurality of objects, the carrier comprising first, second and third elements hingeably attached to one another in a first hinge region, and wherein the second and third elements carry first and second protective regions thereon, respectively, for holding an object therein, and wherein a first carriage is attached to the first element by a second hinge offset from the first hinge region and extends into the first protective region, and a second carriage element is attached to the second element by a third hinge offset from the first hinge region and extends into the second protective region.

Advantageously the depth of the spine joining the front portion and the back portion is equal to the sum of the thickness of the object for which the carrier is adapted, the thickness of the front and rear portions and the protective region. It is thus possible to ensure that there is little or no load on the spine when pressure is applied against the major faces (as defined as being perpendicular to the plane of the front and rear portions) of the carrier. This configuration prevents the carrier from being squashed or crushed under pressure, for example where several carriers are in stacked or side by side configuration.

The carriage may be provided with a means to lift or hold the object off from the surface of the carriage portion in order to protect the playing surface or the information carrying surface from being damaged when the object is a data carrier such as a CD, DVD, minidisk or the like.

Conveniently, the case is provided with a second pocket or other holding means to hold additional articles such as a booklet relating to the CD, or business cards. For example, there may be a pocket in or on the front portion of the carrier in which the booklet fits or there may be tabs inside the front portion to hold the booklet in position. The pocket may be provided with a stopping means such as one or more internal projections to prevent the booklet from sliding down into the case.

The case may be provided with a lock to hold it closed. The lock may be formed by a tab on the front cover and a loop on the back cover into which the tab fits when the case is closed. Other arrangements are clearly within the knowledge of the person skilled in the art.

Preferably, the case is made of flexible paper or card. The paper or card may be reinforced by a plastic film or alternatively the case may be made of a flexible plastic material. Use of plastic or paper reinforced by a plastic film may also enhance the resistance of the case to the presence of water or other liquids.

It will also be appreciated that the case can be designed in any size, or shape or configuration to suit the object to be carried or to meet any marketing needs. Thus, for example, if the case is being made to carry a DVD, the shape of the case can be an oblong shape to match the size and shape of current DVD carriers. Similarly the carriage can be adapted to convey other high volume or promotional items, such as keys, precious stones and so on. The case can also be adapted to be a convenient package for items such as cigarettes and pharmaceutical products.

According to a third aspect of the present invention there is provided a blank comprising: a first panel connected to a second panel; a third panel connected to the second panel such that the third panel can be folded over the second panel to form a protected region; a carriage panel connected to a pocket panel such that the pocket panel can be folded over the carriage panel to form a pocket; and an intermediate panel connected to the carriage panel, and wherein the intermediate panel joins the first panel along a boundary that is not parallel to the connection between the first and second panels.

The invention will now be described, by way of example only, with the reference to the accompanying drawings in which, FIG. 1 schematic diagram of a case constituting an embodiment of the present invention when in an open configuration;

Figure 1:
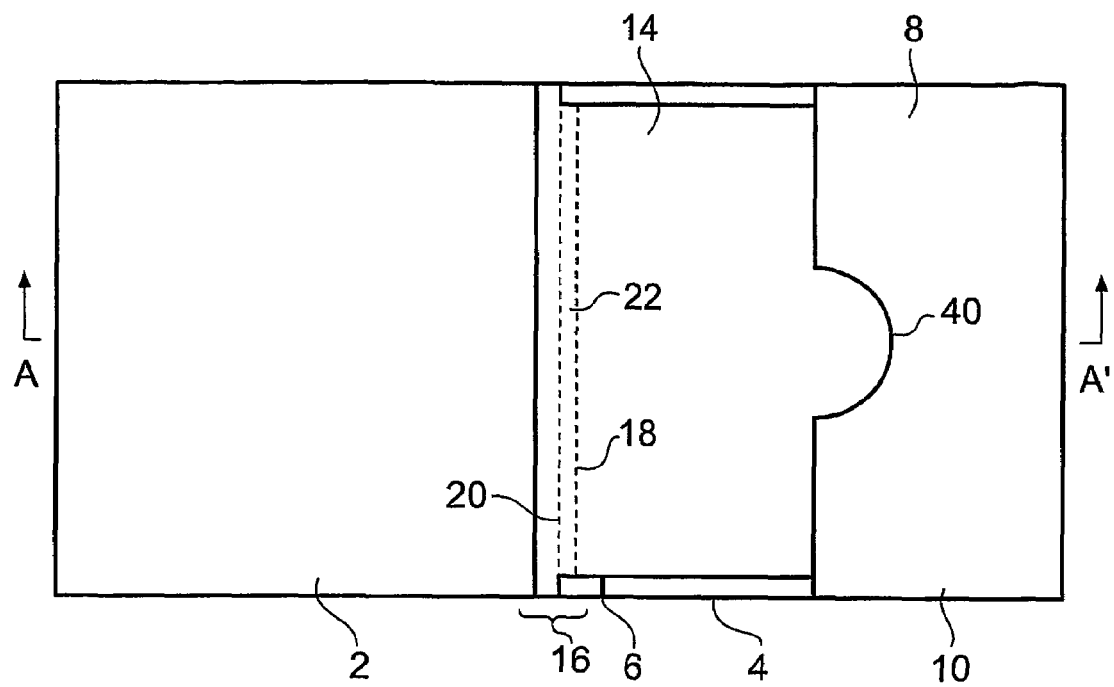
Figure 2:
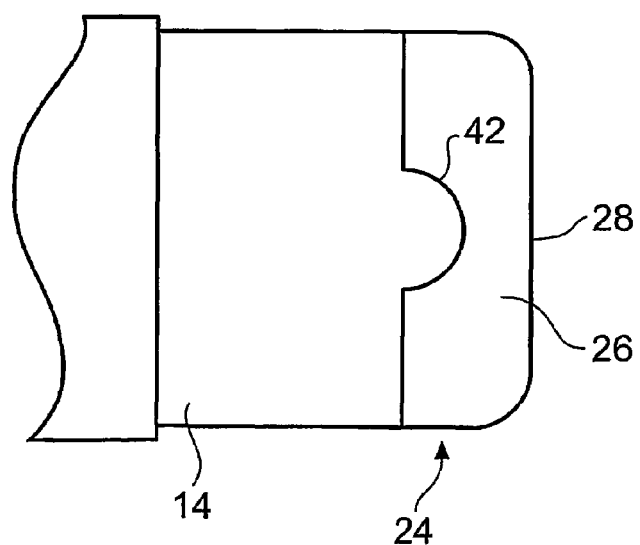
FIG. 2 shows the carriage of the embodiment of FIG. 1 in greater detail.
Figure 3:
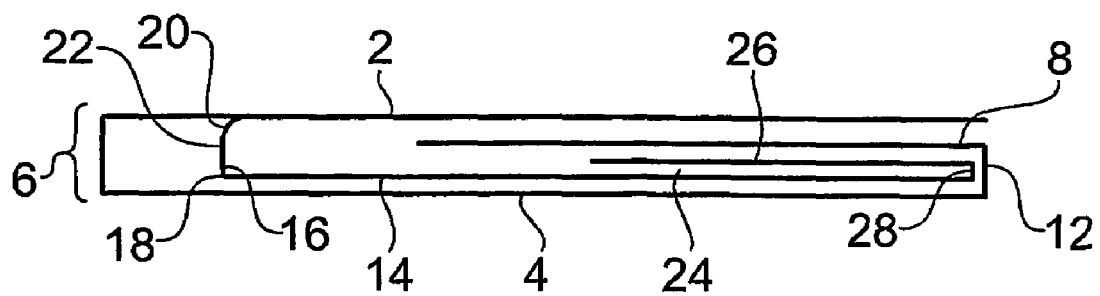
FIG. 3 is a cross section along the line A-A' of FIG. 1 of the case when in a closed configuration.

FIGS. 1 to 4 schematically illustrate a case constituting a first embodiment of the present invention. As shown in FIG. 1, a front panel 2 is attached to a rear panel 4 via a first hinge 6. The front and rear panels 2 and 4 may be made from a single sheet of material and the hinge 6 may simply be formed by a fold between the panels 2 and 4. However, the hinge 6 may comprise first and second sub-hinges connecting the front panel 2 to a wall portion, and the wall portion to the rear panel 4, respectively, as shown in greater detail in FIG. 3. The rear panel 4 carries a protective region 8 in which the object enclosed by the case is normally located. The protective region 8 may be formed by a further sheet 10 of material attached to the second panel 4 at a peripheral region thereto or attached to the second panel 4 by an intermediate wall 12 as shown in FIG. 3, in order to form a pocket.

A carriage 14 is attached to the front panel 2 at a second hinge 16. The hinges 6 and 16 are parallel with each other but laterally offset with respect to one another. The hinge 16 may be formed as two hinges 18 and 20 disposed either side of an interconnecting wall 22. The hinges 18 and 20 may easily be formed by folds in the material constituting the carriage 14. The carriage carries a pocket 24 thereon which is defined by a further sheet of material 26 which is disposed above the carriage 14 and is joined therewith along an end portion 28. The pocket 24 serves to hold the object, such as a CD, thereby ensuring that the CD moves with the carriage 14. For ease, the further sheet 26 may simply be a folded back portion of a sheet of material forming the carriage itself.

Figure 4:
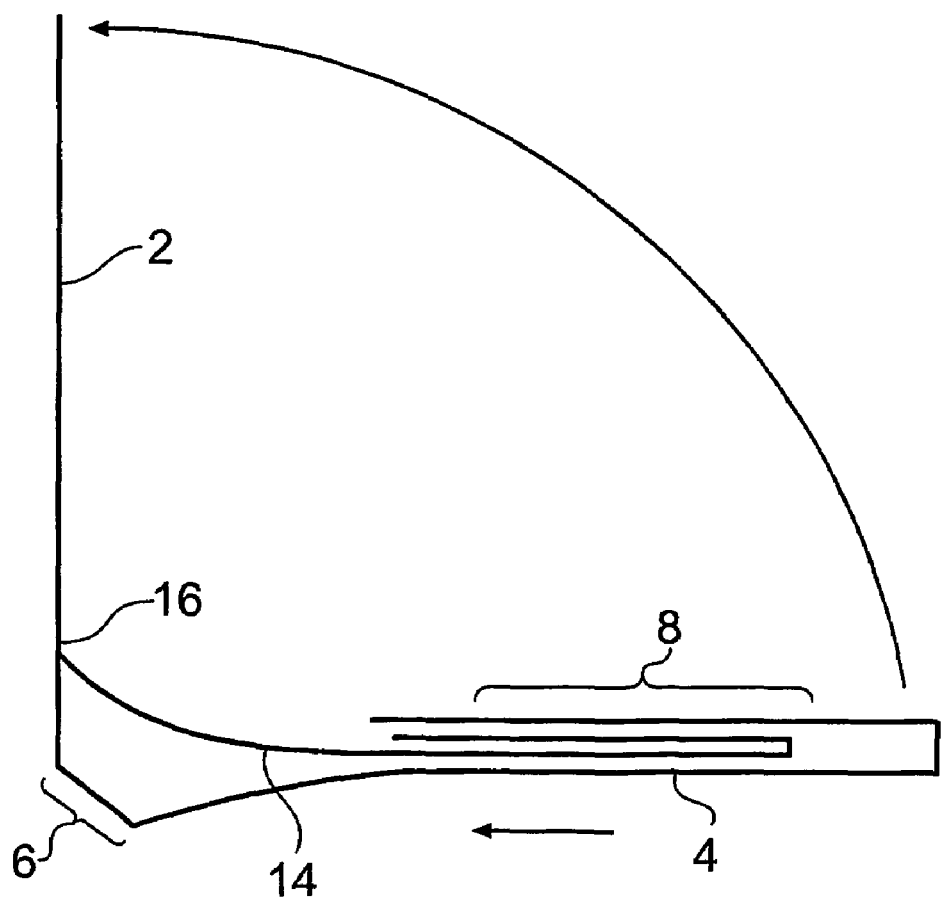
FIG. 4 is a cross-section through the case showing it in a partially opened configuration.

FIG. 3 shows the case in the closed configuration. Thus an end 28 of the carriage 14 is disposed towards the wall 12 of the case. The CD is therefore held almost entirely within a protected region. However, when the case is opened the carriage slides out of the protected region in order to present the object for removal. FIG. 4 illustrates the case in a partially opened configuration. It will be appreciated that when the case is fully opened the front panel 2 lies substantially in the same plane as the rear panel 4. During the opening process, the front and rear panels 2 and 4 pivot with respect to one another around the hinge 6 which in this example is a composite hinge formed of two hinges separated by an intermediate wall. Comparing the position of the second hinge 16 with respect to the first hinge 6, it can be seen that in FIG. 3 the second hinge 16 lies between the first hinge 6 and the end wall 12, that is to the right of hinge 6 as shown in FIG. 3; whereas in FIG. 4 the hinge 16 is moving away from that position and when the case is fully opened the second hinge 16 will lie to the left-hand side of the first hinge 6. This repositioning of the second hinge 16 from one side of the first hinge 6 to the other side thereof is transmitted to the carriage 14 and hence causes the carriage 14 to become partly withdrawn from the protective region 8. This in turn moves the object, such as the CD to a position where it can be grasped and removed from the case.

Returning to FIG. 1, it can be seen that a cutaway 40 is formed in the upper surface of the protective region 8, and a cutaway 42 is formed in the upper surface 26 of the carriage 14 (FIG. 2). When the case is in the open configuration, these cutaways align allowing a user to reach through these regions and to place their finger in the central hole which is formed in CDs and similar data carriers. This facilitates the extraction of the data carrier from the case.

Figure 5A:
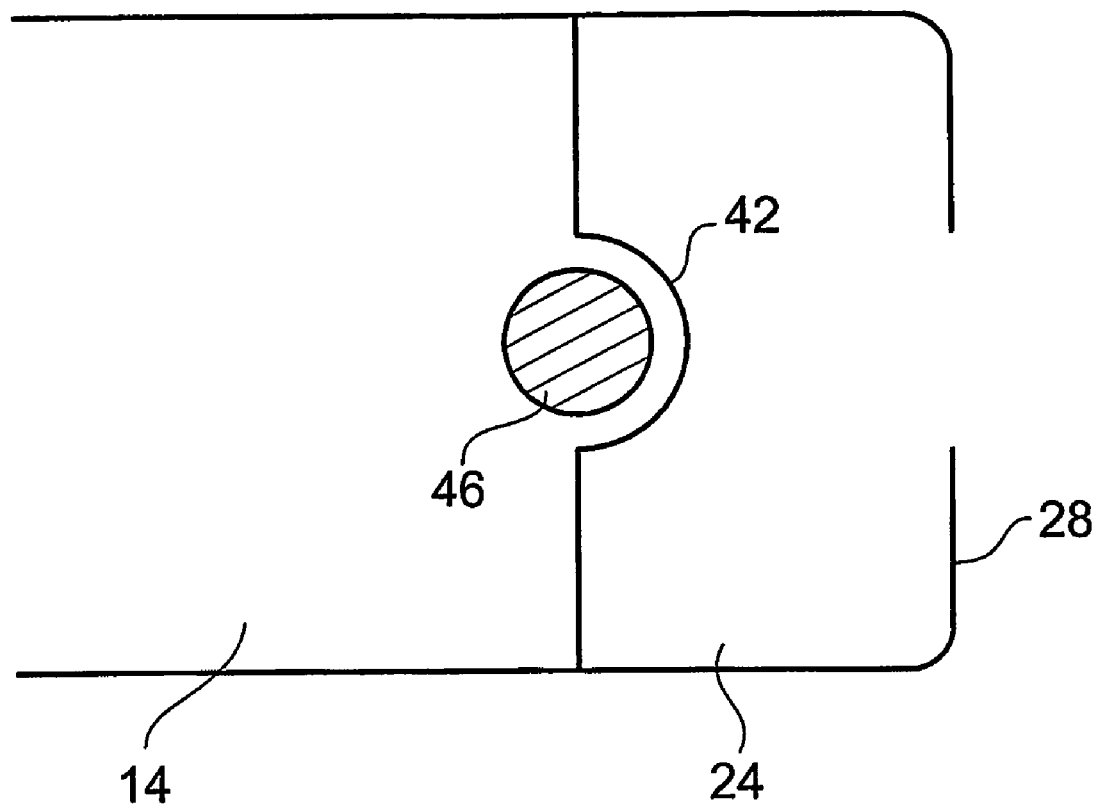
FIGS. 5a and 5b show plan and cross-section views, respectively, of a modified carriage.
Figure 5B:
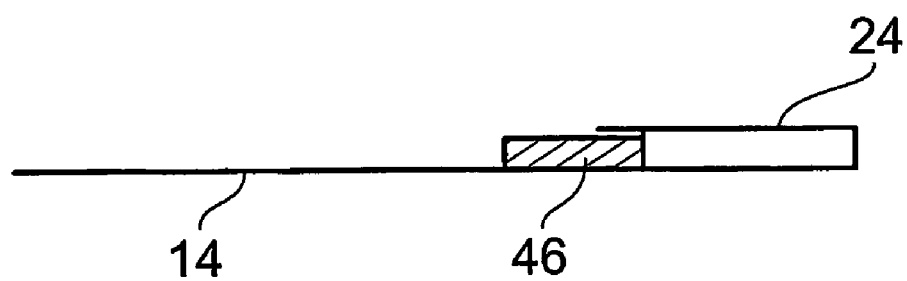

FIGS. 5a and 5b schematically illustrate a modification to the carrier in plan view and a cross section, respectively. A disk shaped projection 46 is disposed on the carriage 14 in such a position that it will align with the central portion of a CD or other data carrier when the CD is held within the case. The projection 46 serves to ensure that the data bearing portion of the disk does not abut directly with the material of the carriage 14. In a further embellishment, a second projection of a small diameter may be centrally disposed on the projection 46 so as to partially or fully extend through a central hole within the data carrier in order to secure it in position. However, it is expected that this feature will not be often used in practice as the dimensions of the pocket 24 are such that the periphery of the data carrier is in close proximately to the side walls of the pocket and hence the carrier is not free to slide about therein.

Figure 6:
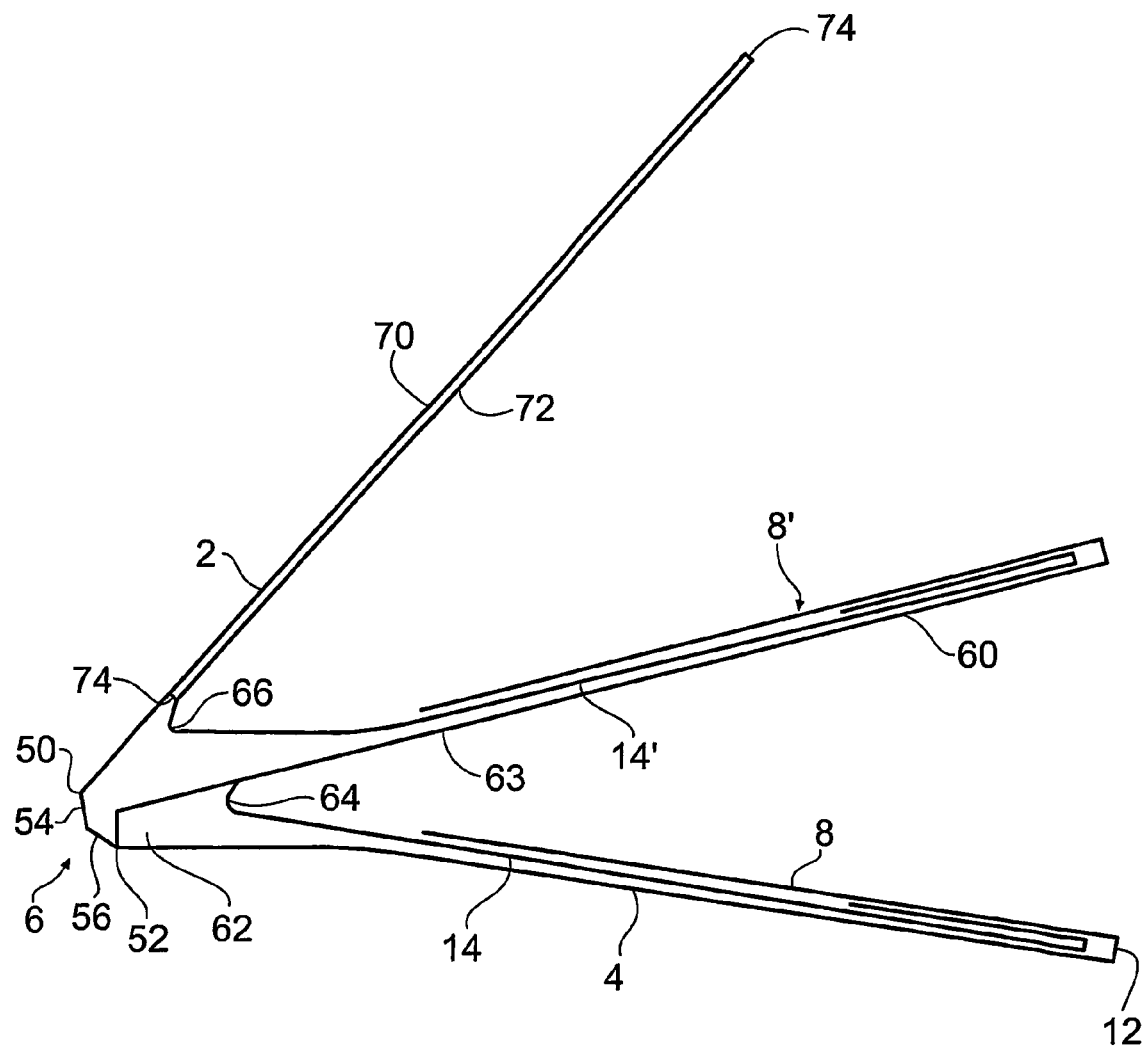
FIG. 6 is a cross-section through a double CD case constituting an embodiment of the present invention.

FIG. 6 is a cross section through a double case constituting an embodiment of the present invention. Parts of the case shown in FIG. 6 are very similar to parts of the case described with reference to FIGS. 1 to 4 and like reference numerals would be used for like parts where appropriate. The case shown in FIG. 6 has a rear panel 4 which carries a protective region 8 in the form of a pocket thereon. A front panel 2 is hingeably connected to the rear panel 4 via a hinge 6 which itself comprises first and second hinges 50 and 52 formed either side of an intermediate wall 54 which itself may optionally have a centrally disposed hinge 56. An intermediate panel 60 is provided which is hingeably attached to the back panel 4 at a hinge region generally indicated 62. A carriage 14 of the type disclosed hereinbefore is hingeably attached to a rear surface 63 of the intermediate element 60 via a hinge 64 which is laterally displaced from the hinge region 6. The intermediate element 60 also carries a protective region 8' on a side thereof facing towards the front panel 2 when the case is in a closed configuration. A further carriage 14' is associated with the intermediate panel 60 and the further carriage 14' is hinged to the front panel 2 at a hinge 66 which is also offset from the hinge region 6. Thus data carriers can be inserted or removed from either protective region 8 or 8' by opening the carrier in much the same manner as one opens a book to reveal the correct page.

The front panel may in fact be formed by two sheets of material 70 and 72 connected together at their periphery, but having one open end 74 to form a slot through which a data card or booklet may be pushed in order to hold it securely between the sheets 70 and 72. An end stop 74 is formed in order to prevent the booklet progressing too far into the space between the sheets 70 and 72 and thereby becoming inaccessible. Cut outs provided in the region of the slot 74 in order to facilitate manual grasping of the data card in order to retrieve it.

Figure 7:
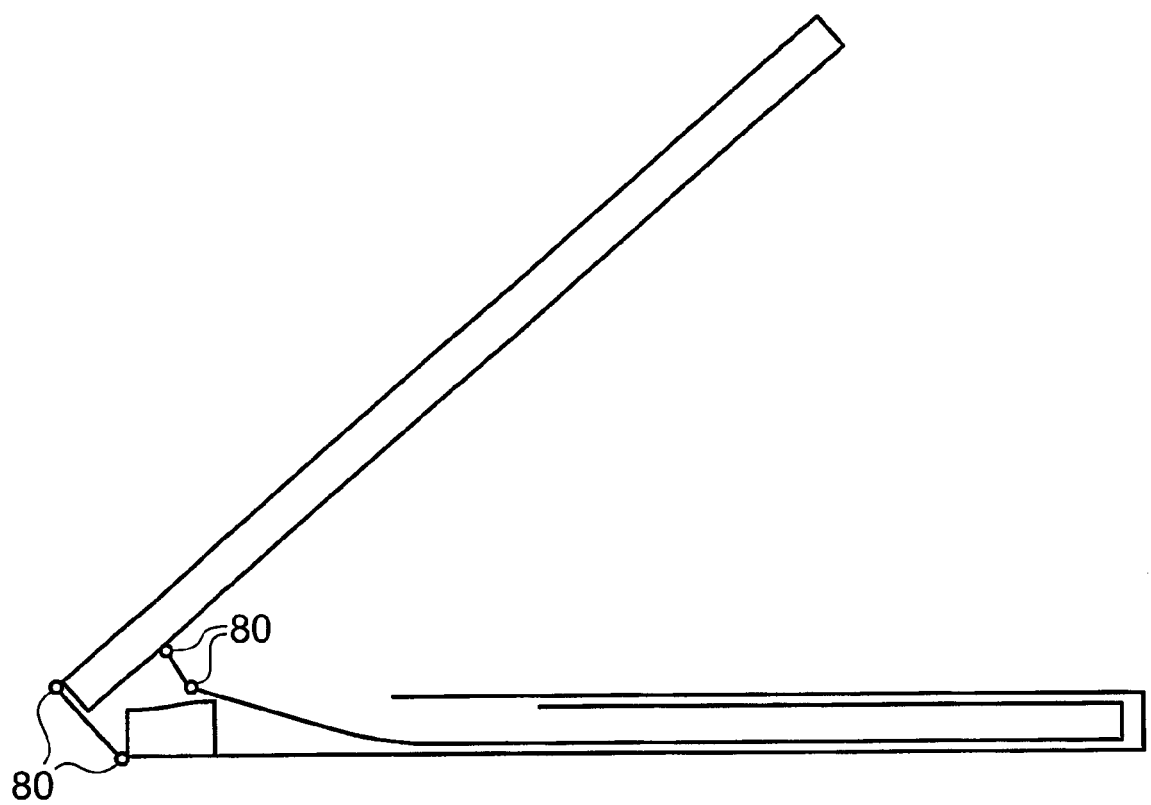
FIG. 7 is a cross-section through a single DVD case constituting an embodiment of the present invention.
Figure 8:
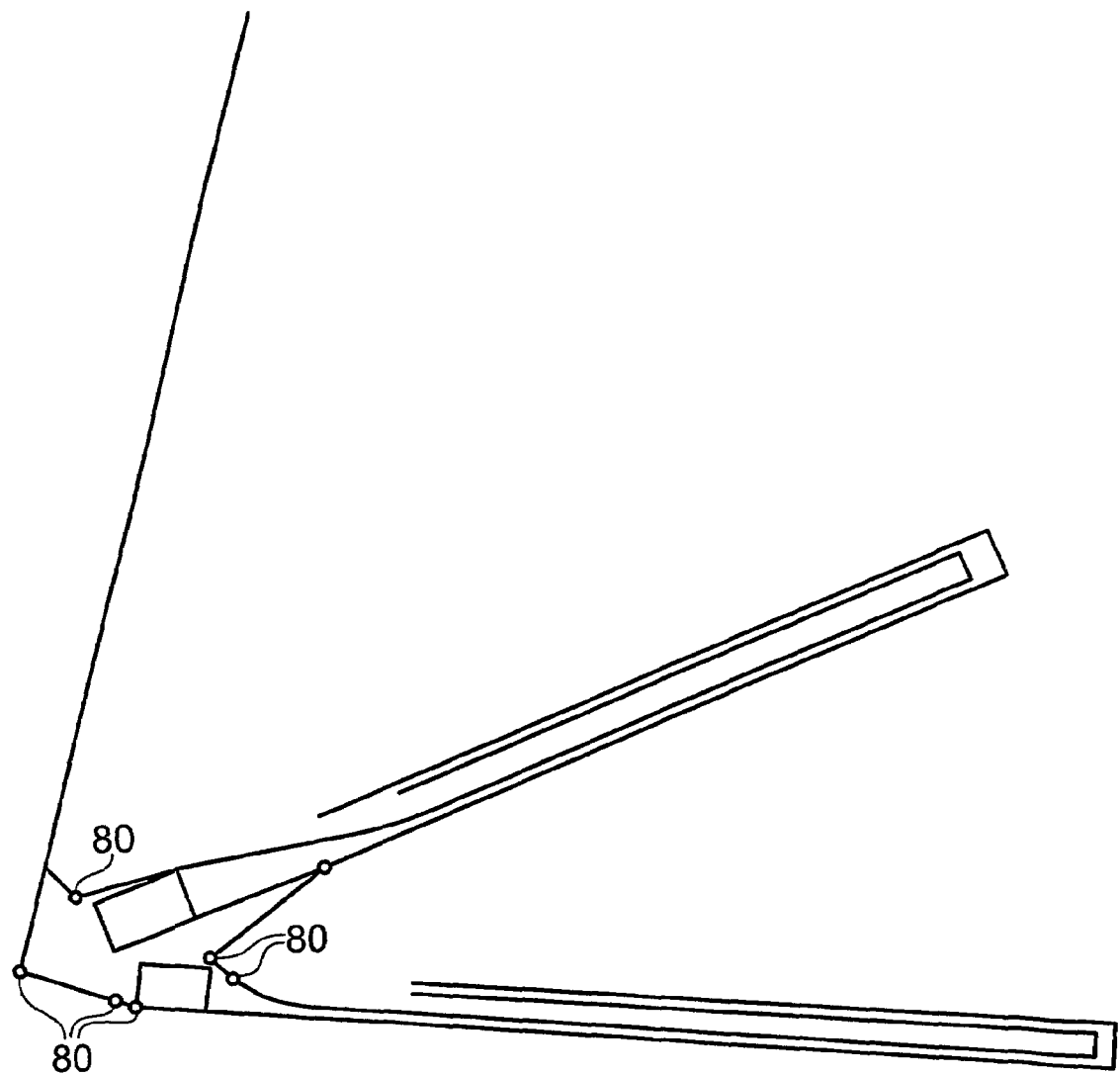
FIG. 8 is a cross-section through a double DVD case constituting an embodiment of the present invention.

The market for CDs and DVDs has developed such that DVDs are presented in thicker cases although there is no intrinsic technical reason for doing this. FIGS. 7 and 8 schematically illustrate cross sections through embodiments of the present invention which are deliberately formed so as to be thicker in order to facilitate acceptance of the invention for storage and transport of DVDs. In order to facilitate the extra thickness box sections are formed in order to increase the depth of the case. Each of FIGS. 7 and 8 is a cross section through the central portion of the case, and hence end walls would close the sections that are illustrated. Hinges are represented by the dots 80. Construction is otherwise similar to that described with reference to the CD cases in FIGS. 1 to 6.

Figure 9:
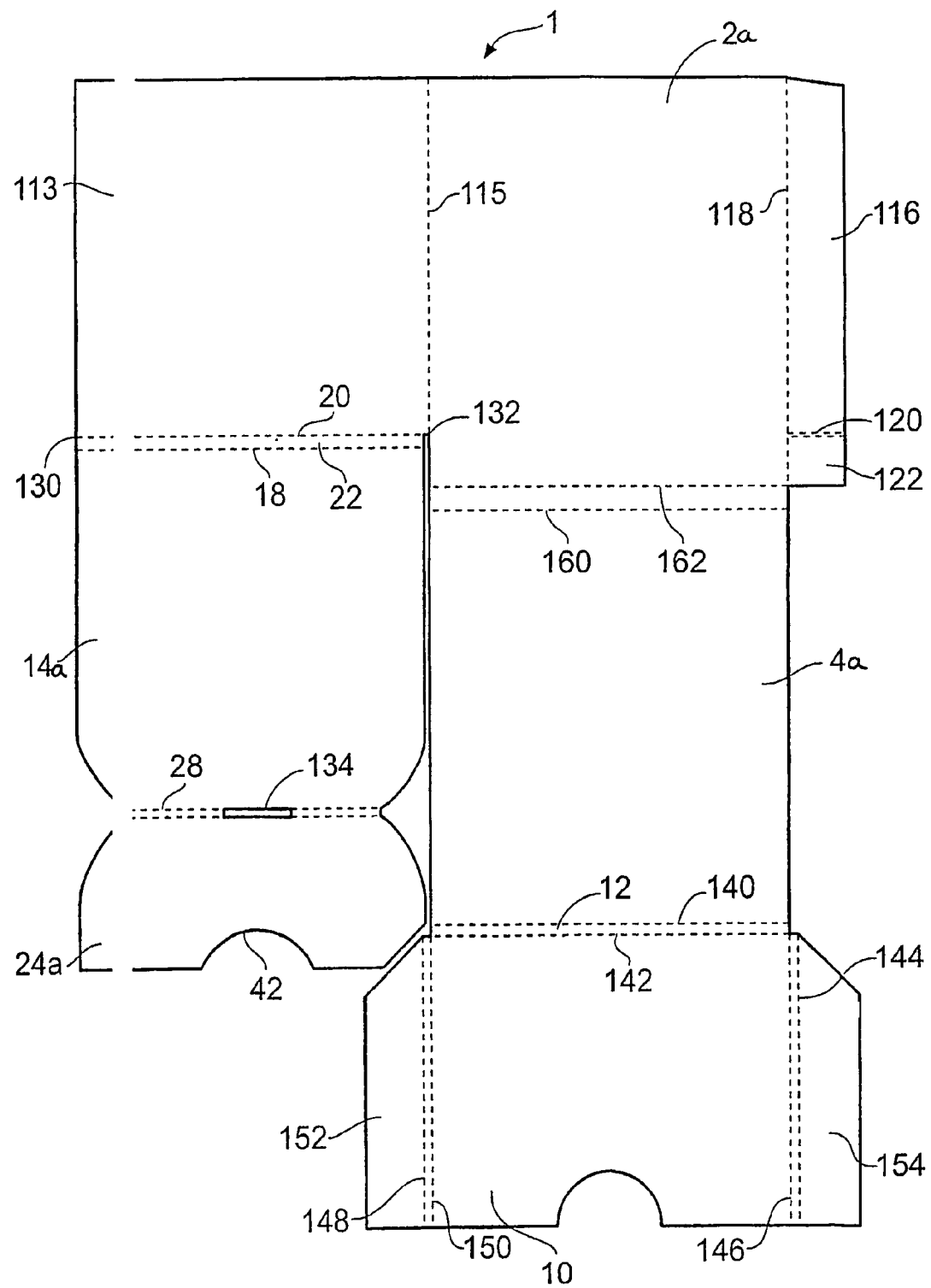
FIG. 9 is a schematic drawing of an unassembled carrier constituting an embodiment of the invention.

FIG. 9 illustrates an unassembled version of the case shown in FIG. 1, showing dotted lines where the folds are made such that when folded the assembled carrier is formed. The solid lines show where the cuts are made. The case can be formed out on a single sheet of material, such as flexible card and folded at the indicated positions to provide the assembled case. Thus a first panel 2a (which in use will form the front panel 2) is attached to a second panel 4a. One or more scores may be made in the card (or other suitable material) to define hinges. In this example two scores have been made to define hinges 160 and 162 that cooperate to form the hinge shown in FIG. 3. The second panel is also attached to a third panel 10 which in use is folded over the second panel 4a to form the protective region 8. The third panel 10 is advantageously positioned on the opposite side of the second panel 4a to the first panel 2a as this makes the manufacture of the product easier to automate given the restricted range of automated folds that can be reasonably easily made on a production line.

A carriage panel 14a is attached to a further panel 24a which in use is folded over the carriage panel 14a to form the pocket 24. To provide an easily manufacturable product the carriage is also attached to a intermediate panel 113 which itself is attached to the first panel 2 along a fold line 115 which is perpendicular to the fold line 160. i.e. perpendicular to hinge 6.

Intermediate panel 113 is folded over (along fold 115) to lie against the first panel 2. The panels 113 and 2 can be adhered together. However, more beneficially a further flap 116 hingeably attached to the first panel 2a along a fold line 118 opposite the fold line 115 is provided such that the flap 116 can be adhered to the intermediate panel 113 to hold it in the folded position and in so doing a pocket is formed between the panels 2a and 113. Furthermore an end stop can be defined in the pocket by providing a booklet stop tab 122. Thus if the flap 116 is folded over to lie against the panel 2a and the stop tab 122 is adhered to the panel 2a and then the intermediate panel 113 is folded over and adhered only to the flap 116 a pocket having an internal obstruction to stop items such as CD album inserts falling out of the hinge end of the pocket is provided.

The carriage panel 14a is cut such that it is slightly smaller in width than the intermediate panel 113 at positions 130 and 132. Folding along the dotted lines 18 and 20 forms the hinge 16 for the carriage 14. The carriage panel 14a and the panel 24a are cut at an angle as shown in FIG. 9 to substantially match the shape of a CD when the inner panel 24a is folded at hinge 28 onto the carriage panel 14a. The hinge 28 is provided with a slot 134 therein which helps to hold the CD in place. The third panel 10 is folded along the dotted lines 140, 142 over the second panel 4a which, in use forms the rear panel 4. Flaps 152 and 154 are folded about the lines 144, 146, 148 and 150 and are glued to the upper surface of the panel 4a to form the pocket. The whole assembly is then folded along the dotted lines 160 and 162 to form the hinge to open and close the carrier.

Figure 10A:
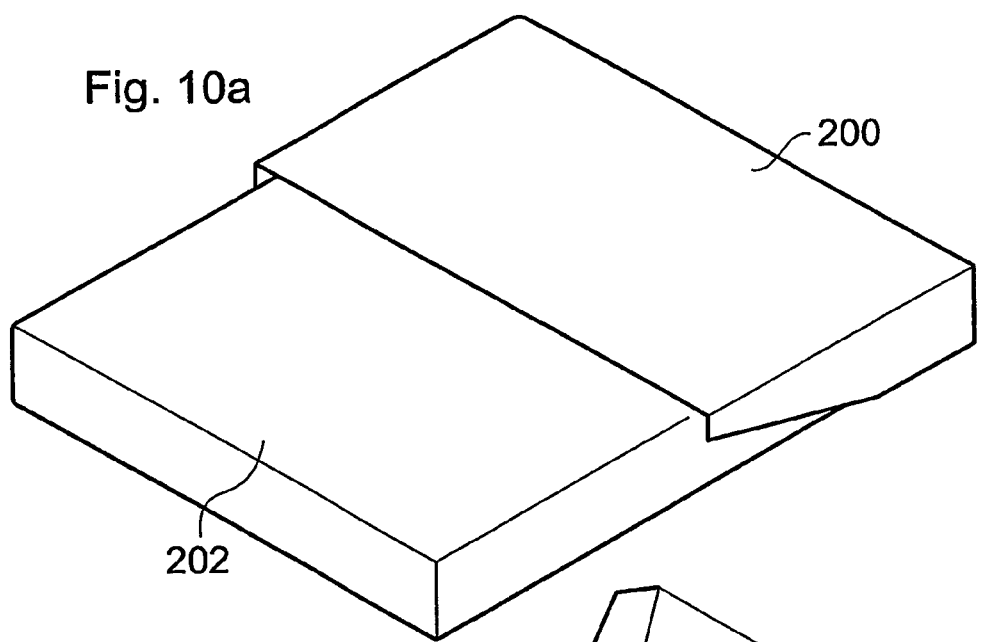
FIGS. 10a, 10b and 10c illustrate a cigarette packet constituting an embodiment of the present invention.
Figure 10B:
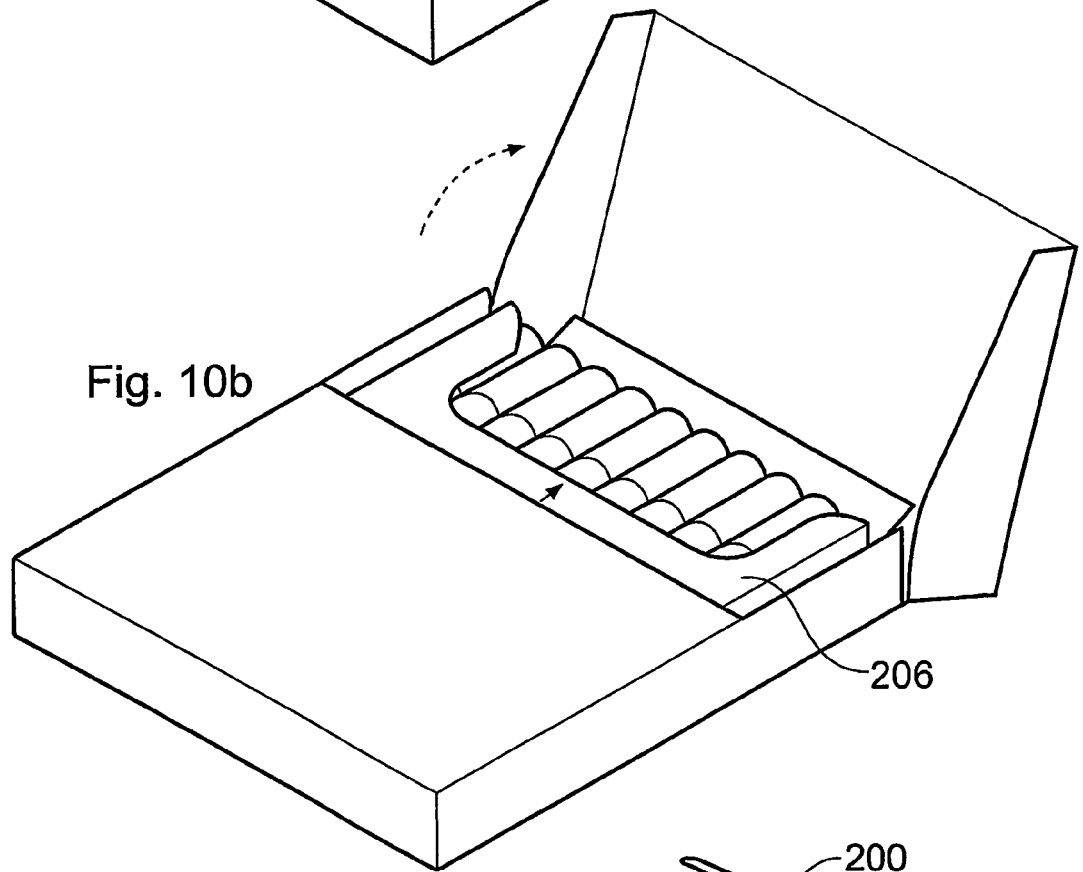
Figure 10C:
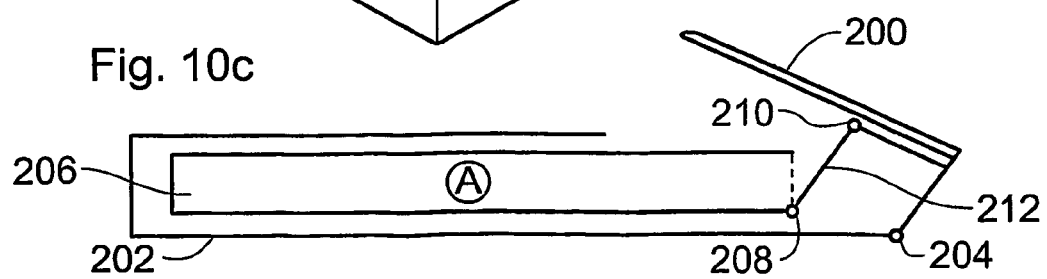

The principles of the present invention can be applied to cases for other items, such as cigarettes. An example of a cigarette packet constituting an embodiment of the present invention is shown in FIGS. 10a, 10b and 10c. FIG. 10a shows a packet in a generally closed configuration. The packet comprises a lid 200 which is hingeably attached to a base 202 along a hinge line 204. The cigarettes are held in a carriage 206 which is connected to the lid via an arrangement comprising folds in cardboard extending from the upper end of the carriage 206 in order to define a first hinge 208, a second hinge 210 and an intermediate wall 212. The hinges 208 and 210 are offset from the hinge 204 between the lid 200 and the base 202 in such a way, as shown in FIG. 10c, that the opening of the lid in parts motion to the carriage 206 from the bottom of the cigarette packet and lifts the cigarettes up for easier extraction.

Figure 11:
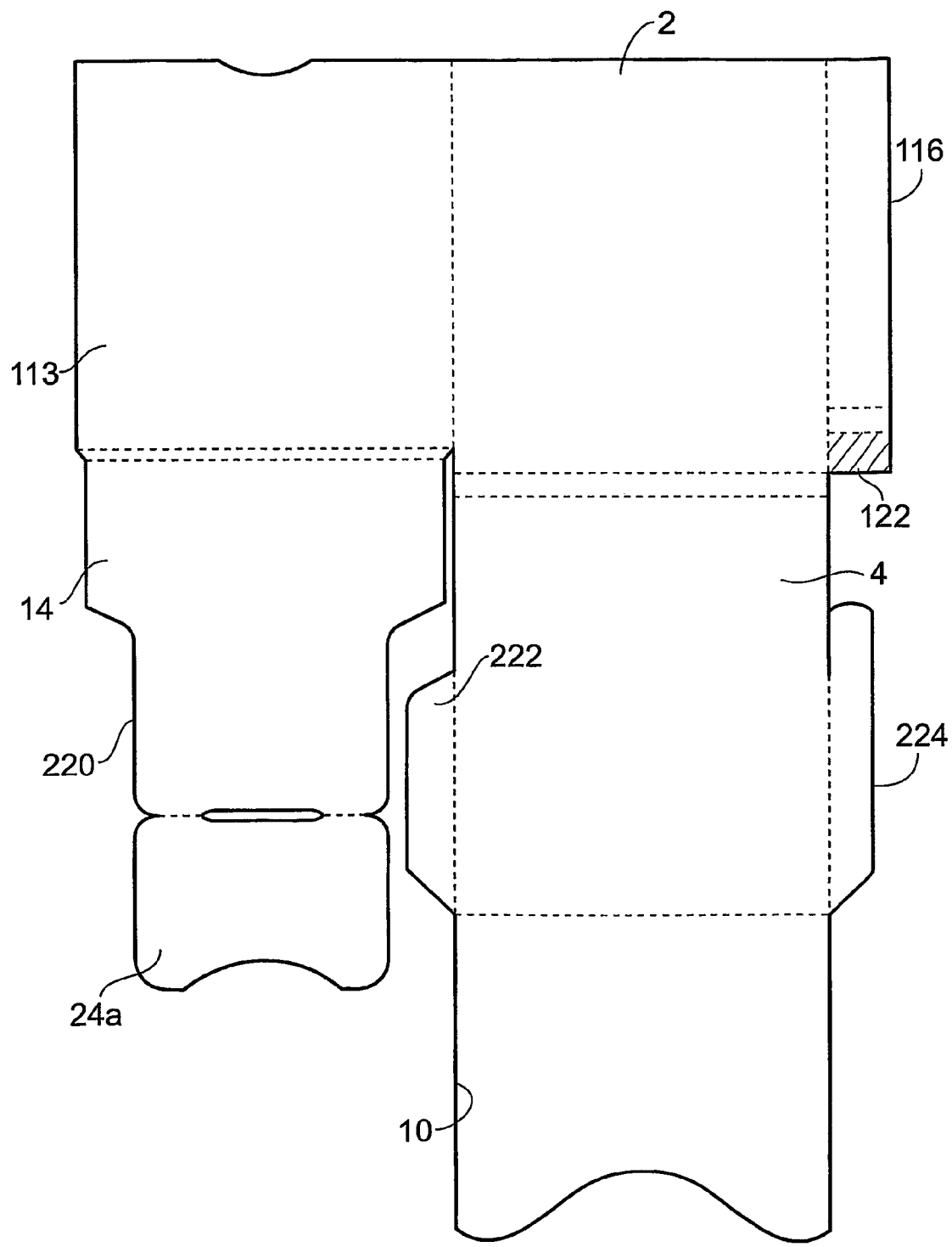
FIG. 11 is a plan view of a modified blank.

FIG. 11 shows a further blank constituting an embodiment of the present invention. The blank is in many ways similar to that shown in FIG. 9. However the panel 14 is cut to have thinned region 220 and additional tabs 222 and 224 are formed on the second panel 4. The tab 222 has, in this example, been cut such that it never overlaps with the back panel 14 in the finished case, irrespective of weather the cases open or closed. However the panel 224 has been formed longer such that it always overlaps with the carriage 14 irrespective of weather the case is open or closed. During manufacture of a CD case from this blank, glue is initially applied to the stop tab 122 and then the flap 116 is folded over such that the stop 122 is adhered to the front panel 2. A glue line is then placed along the upper exposed surface of the flap 116 and the portion 113 is then folded over the front panel 2 in order to adhere to the flap 116. Next the tabs 222 and 224 are folded over to lie against the rear panel 4 and a glue line is then placed on their upper surfaces. At this stage the carriage 14 is also lying over the rear panel 4. Next the folding operation is performed which simultaneously causes the third panel 10 and the further portion 24 *a* to fold about their respective hinge lines thereby forming the carriage and pocket within the protective region.

Figure 12:
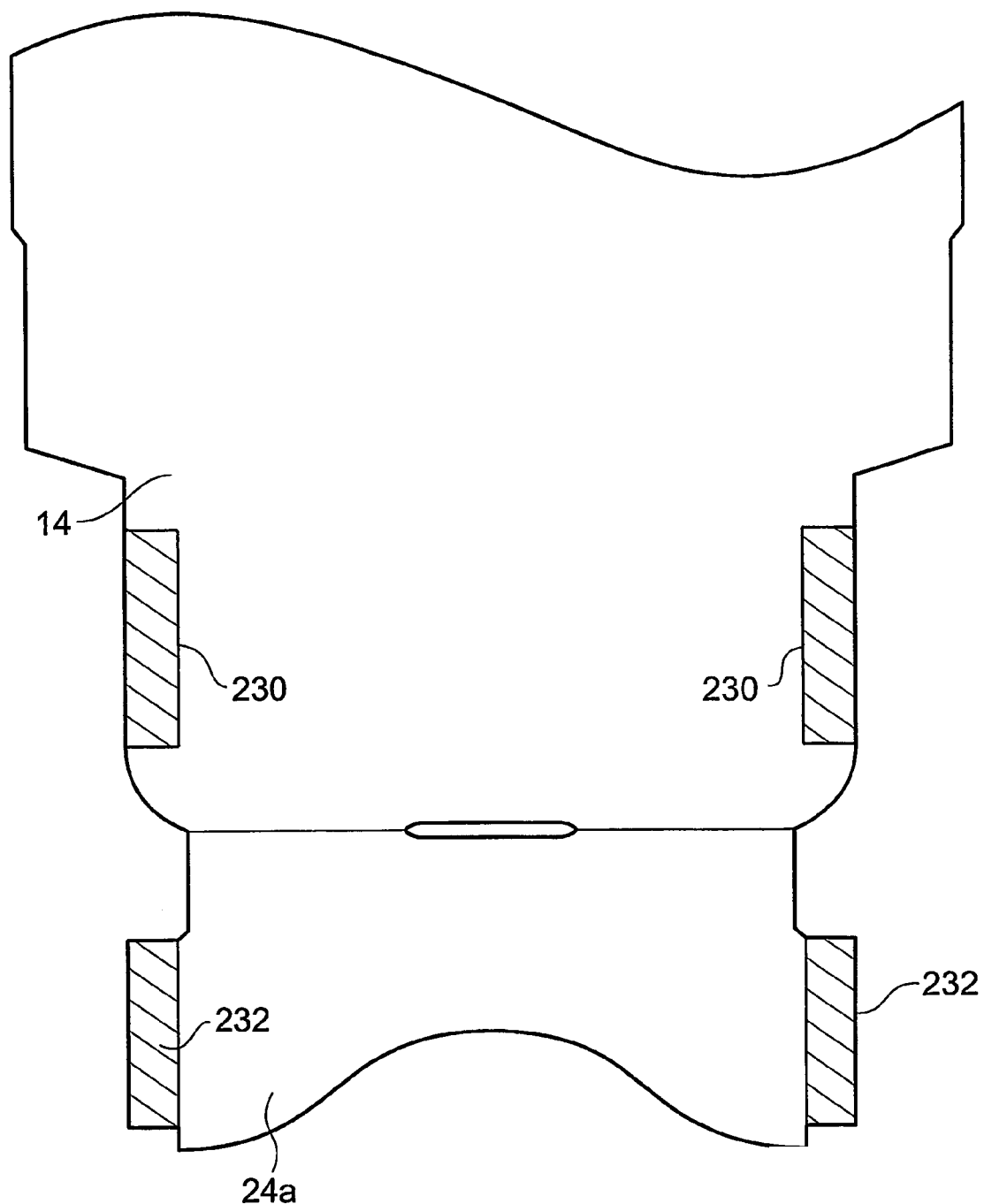
FIG. 12 is a close up of the carriage portion of a further blank constituting an embodiment of the present invention.

FIG. 12 schematically illustrates the carriage 14 and further portion 24a in greater detail for a modified variant of the invention. In this embodiment, during production of the blank embossing is also performed such that the shaded areas 230 and 232 stand upwardly of the blank. Formation of such embossed regions is easily performed by a person skilled in the art. A glue line is also placed over the regions 230 and/or 232 such that when the portion 24a is folded over the panel 14 the regions 230 and 232 interengage and adhere together thereby holding the panel 24a slightly apart from the panel 14 to form a three dimensional pocket.

Figure 13:
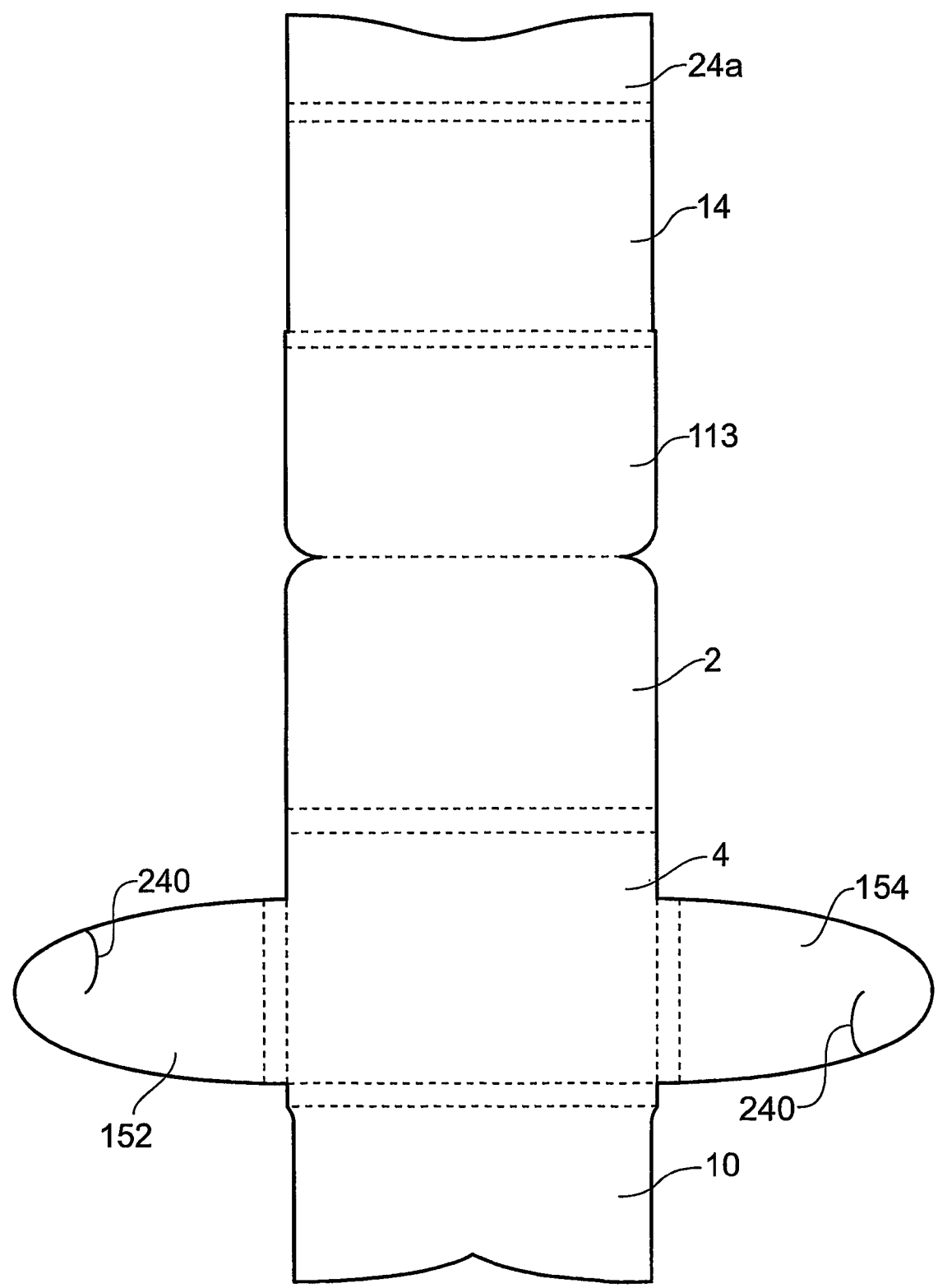
FIG. 13 is a plan view of a blank for a business card holder constituting an embodiment of the present invention.

FIG. 13 illustrates a blank for a business card wallet constituting an embodiment of the present invention. For brevity, parts thereof analogous to parts within FIG. 9 have been given the same reference numerals. However intermediate walls of increased depth are formed between the front and back panels 2 and 4, and also between the back panel and the third panel 10, and the flaps 152 and 154. Cuts 240 are formed in the panels 152 and 154 such that the panels can be slid into one another to mechanically interengage thereby avoiding the use of adhesive, although of course adhesive can still be used to manufacture this product.

In further variations, double or triple data carrier cases can be manufactured by placing two or more single data carrier cases together with suitable gluing to form them into a composite product. Thus if two single CD cases are used to form a double CD case, then if one case is stacked on top of the other case, then the bottom surface of the uppermost case is adhered to the top most surface of the lowermost case. Both cases can then be further shrouded by a simple cardboard sleeve, much like the cover of a book, if desired.

Although the invention has been illustrated with carriers for CDs, DVDs and minidisks, it will be appreciated that the invention can be used to carry other objects. Also, the hinge mechanisms of the invention can be applied to display other articles, features, objects in the carrier according to the invention.

The invention claimed is:

1. A blank for use in the manufacture of a case, the blank comprising:
   a first panel connected to a second panel by a first hinge;
   a third panel connected to the second panel such that the third panel can be folded over the second panel to form a protected region;
   a carriage panel connected to a pocket panel which is smaller than the carriage panel such that the pocket panel can be folded over the carriage panel to form a pocket on a carriage; and
   an intermediate panel connected to the carriage panel by a second hinge, and wherein the intermediate panel joins the first panel along a boundary that is at right angles to the first hinge and the second hinge is parallel to and laterally offset from the first hinge such that when a case is made by the steps of:

a. folding the intermediate panel about its boundary with the first panel such that the intermediate panel overlies the first panel and the carriage panel overlies the second panel;
   b. folding the pocket panel and the third panel over such that the protected region is formed between the second and third panels, and the pocket on a carriage is within a projected region;
   a case is formed by the carriage panel and the pocket panel in which in use the pocket translates with respect to the second panel when the case is moved between open and closed configurations by folding the first panel around the first hinge.

2. A blank as claimed in claim 1, wherein the blank comprises a further flap connected to the first panel on a side opposite the intermediate panel.

3. A blank as claimed in claim 2, wherein the further flap is used to form a stop tab to inhibit articles from falling out of a pocket formed by the first panel and the intermediate panel.

4. A blank as claimed in claim 1, wherein the third panel is connected to the second panel at a side thereof opposite to the connection between the first panel and the second panel, and wherein the third panel or the second panel has flaps for securing the second and third panels together to form a pocket.

5. A method of forming a case from a blank as claimed in claim 1, comprising the steps of:
   a) folding the intermediate panel such that it overlies the first panel and the carriage panel overlies the second panel, and
   b) folding the pocket panel and third panel over such that the carriage panel is within a protected region.

6. A method as claimed in claim 5, wherein the blank further comprises a flap connected to the first panel on a side opposite the intermediate panel and wherein prior to performing step a), the further flap is folded over the first panel and adhesive is positioned on it or a portion of the intermediate panel such that the intermediate panel adheres to the further flap.

7. A carrier for a plurality of objects, the carrier comprising a front panel, an intermediate panel, and a rear panel hingeably attached to one another by respective first, second and third hinges, and wherein the a first protective region for holding a first object therin intermediate and rear panels carry and a second protective region thereon for holding a further object therin respectively and wherein the front panel is attached to the rear panel by a first hinge, the first carriage is attached to the front panel by the second hinge which is laterally offset from the first hinge and the first carriage extends into the first protective region, and a second carriage is attached to the intermediate panel by the third hinge laterally offset from the first hinge and the second carriage extends into the second protective region.

8. A case for an object, the case comprising a first portion hingeably attached to a second portion, and a carriage for holding the object, the carriage being movable in response to the movement of the first portion with respect to the second portion between a first position where the object is held in a protected space and a second position where the object is presented for removal from the case, and the carriage is hingeably attached to the first portion by a hinge which is offset from the hinge interconnecting the first and second portions, the case further comprising a third portion hingeably attached to the first portion, and a second carriage for holding a further object, the second carriage being movable in response to movement of the second portion with respect to the third portion between a position where the further object is held in a further protected space and another position where the further object is presented for removal from the case, and the second carriage is hingeably attached to the second portion.

9. A case as claimed in claim 8, in which at least one of the first and second portions is formed with or has at least one wall or other spacing element attached thereto to give the case depth.

10. A case as claimed in claim 8, wherein the case is a case for a data carrier and a holding device is provided to hold a read surface of the data carrier away from the carriage.

11. A case as claimed in claim 8, further comprising a pocket to hold additional articles.

12. A case as claimed in claims 8, wherein the case is a case for pharmaceutical products or cigarettes.

13. A case as claimed in claim 8, wherein the case is a case for CDs, DVDs or other data carriers.

14. A carrier as claimed in claim 8, wherein the depth of a spine interconnecting the first and third elements is selected to be equal to the thickness of the sum of the objects carried in the carrier and the first and third elements.

* * * * *